United States Patent [19]

Jorgensen et al.

[11] Patent Number: 4,973,797
[45] Date of Patent: Nov. 27, 1990

[54] GASKETLESS WEATHERPROOF HOUSING

[75] Inventors: Robert W. Jorgensen, Niles, Mich.; Vance W. Young, Jr.; Scott L. Misenar, both of South Bend, Ind.

[73] Assignee: Hubbell Incorporated, Orange, Conn.

[21] Appl. No.: 330,369

[22] Filed: Mar. 29, 1989

[51] Int. Cl.$^5$ ............................................. H02G 3/08
[52] U.S. Cl. ......................................... 174/53; 174/50
[58] Field of Search .................... 174/50, 52.1, 53; 220/3.8

[56] References Cited

U.S. PATENT DOCUMENTS

| | | | |
|---|---|---|---|
| 2,997,520 | 8/1961 | Kinsman | 174/67 |
| 3,127,048 | 3/1964 | Winter | 220/35 |
| 4,224,484 | 1/1981 | Guritz et al. | 220/3.7 |
| 4,265,365 | 5/1981 | Boteler | 220/3.3 |
| 4,381,063 | 4/1983 | Leong | 220/242 |
| 4,620,061 | 10/1986 | Appleton | 220/3.8 |
| 4,623,753 | 11/1986 | Feldman et al. | 174/50 |
| 4,654,470 | 3/1987 | Feldman et al. | 174/50 |

FOREIGN PATENT DOCUMENTS 2824477  3/1979  Fed. Rep. of Germany ....... 220/3.8

Primary Examiner—Benjamin R. Fuller
Assistant Examiner—David A. Tone
Attorney, Agent, or Firm—Jerry M. Presson; Walter C. Farley

[57] ABSTRACT

A switch or outlet box is formed with a substantially continuous channel around the front edges of the side walls of the box. The channel opens in the same direction as the box interior. A cover closes both the box and the channel, the cover having side walls which lie outwardly of the channel. The cover is dimensioned to loosely fit over the box so that gaps are formed to facilitate drainage of water from the channel. A latch structure holds the cover on. A hinged lid fits over a similar wall structure on the cover.

3 Claims, 3 Drawing Sheets

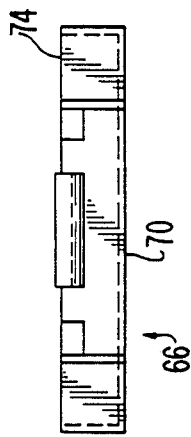
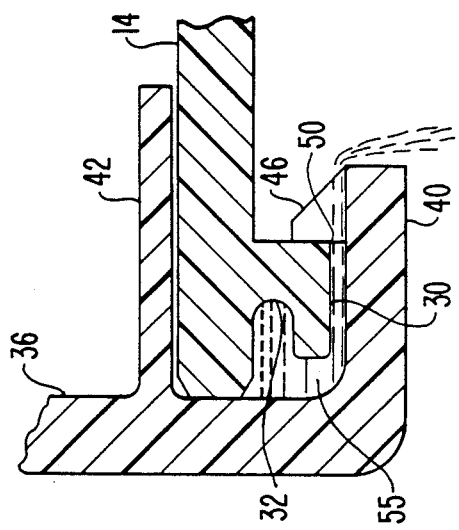
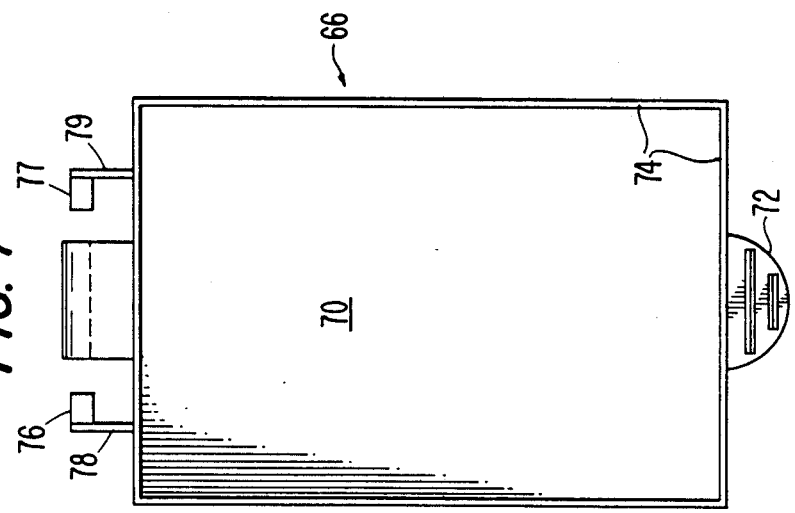

GASKETLESS WEATHERPROOF HOUSING

This invention relates to a housing for receiving electrical wiring or devices and for excluding water, the housing being formed without a gasket.

BACKGROUND OF THE INVENTION

Whenever a device such as a switch or outlet must be mounted in a location where it is exposed to rain and the like, it is necessary to provide a housing which excludes water. Such housings have customarily been made using one or more gaskets. Commonly, the box is formed as an enclosure with side walls and a rear wall, the front being open. A first cover or ring is mounted on the box, usually with screws, and usually with a gasket between the edges of the box and the ring. A second cover or flap is then mounted on the ring, commonly with some form of hinge connection and often using a second gasket.

Other forms of weatherproof housings exist, using gaskets and various arrangements of components. In each such arrangement, the presence of the screws, gaskets and multiple cover components adds greatly to the cost of the assembly as well as to the complexity and difficulty of installation.

SUMMARY OF THE INVENTION

Accordingly, an object of the present invention is to provide a weatherproof box which uses no gaskets but which is constructed in such a way that water tending to enter the box is conducted away from the interior thereof.

A further object is to provide a weatherproof box and cover assembly which requires no threaded fasteners for attaching the cover to the box.

Briefly described, the invention comprises a water-excluding housing for electrical wires and devices comprising a box having side and rear walls forming an enclosure with an open front, the side walls having front edges terminating in substantially the same plane and defining the front opening of the enclosure, and means in at least one of the side and rear walls forming an access passageway for wires to the interior of the enclosure. Wall means defining a substantially continuous, elongated channel extends entirely around the front opening outwardly of the side walls, the channel being generally U-shaped in cross-section with the opening of the U facing in the same direction as the opening of the enclosure. A cover is provided for the box, the cover having a generally planar body shaped and dimensioned to contemporaneously close the front opening and the channel when the body is placed against the open side of the enclosure, and a plurality of side cover walls extending perpendicular to the body outwardly of and surrounding the wall means. Means is provided for holding the cover on the box. The channel is formed so that a gap exists for drainage of water so that water tending to enter the box is conducted to and out of the channel.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this specification, and wherein:

FIG. 7 is a rear elevation of the lid portion of the assembly of FIGS. 1 and 2;

FIG. 8 is an end elevation of the lid of FIG. 7; and;

FIG. 9 is an enlarged partial sectional view of the assembled box and cover along line 9—9 of FIG. 2.

DESCRIPTION OF THE PREFERRED EMBODIMENTS

Figure 1:
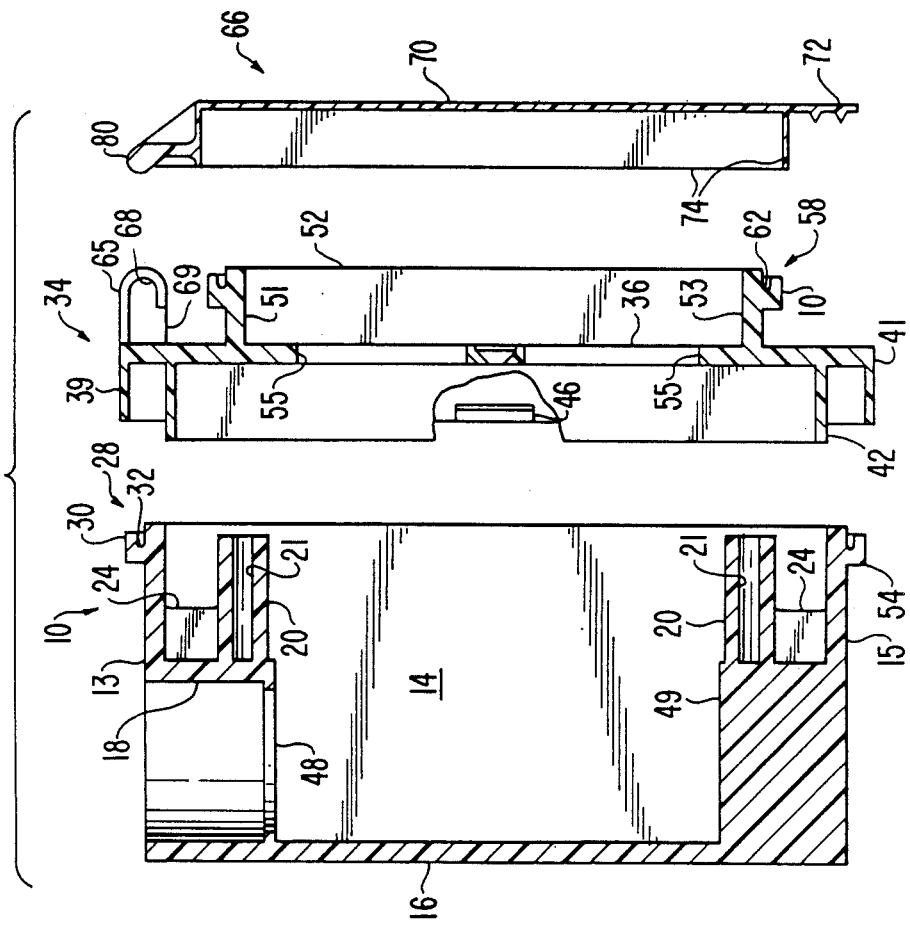
FIG. 1 is an exploded side elevation, in longitudinal section, of a box, cover and lid assembly formed in accordance with the present invention.

As will be seen in FIG. 1, the assembly forming the housing or enclosure of the present invention includes a box 10, a cover 34 and a lid 66. The box performs the function of containing and supporting an electrical device such as a switch or receptacle, the latter being used as an example herein. The cover closes the box but has openings to allow access to the receptacle. The lid covers the receptacle openings and can be manually opened to allow access thereto. It is important for a weatherproof box to have means to exclude water therefrom at the junction areas between these components, such means being provided as will be described.

Referring now to FIGS. 1, 2, 3 and 4 which show a box assembly in accordance with the invention, it will be seen that the assembly includes a box 10 having side walls 12 and 14, end walls 13 and 15, and a back wall 16 defining an enclosure having an open front. The enclosure is dimensioned to receive an electrical device or to contain an electrical connection, or both. For this purpose, end wall 13 has a generally tubular passage 18 forming a hub through which wires can extend into the interior of the enclosure. The wire access passage is formed so that it can be fitted with a sealable connector. Similarly, end wall 15 can be provided with one or more hubs 19 for additional access.

The specific embodiment which will be shown and described is intended to be manufactured from a plastic material although it is quite possible, within the scope of the invention, to form the box using metal, particularly cast aluminum. In either the molded plastic or cast metal embodiment, tubular projections 20 are formed within the box near the opposite ends thereof, these projections having openings 21 to receive attachment screws. Openings 21 are spaced apart by a standard distance so that, for example, a conventional electrical switch can be positioned in the box and the openings provided in the mounting ears thereof will be aligned with holes 21. Projections 20 are additionally supported within the box by molded reinforcing webs 24 which are unitarily formed with and fixedly attached to end walls 15 and 13, respectively, and lateral webs 25 and 26 which prevent projections 21 from being moved from side to side and also form lateral supports for the usual strap at the end of an electrical device mounted in the box so that it does not tend to rock from side to side.

Of particular significance to the present invention is wall means defining a substantially continuous elongated channel extending around the front opening outwardly of the side walls of the box. This wall means, indicated generally at 28, includes an outer wall 30 which cooperates with and is unitarily attached to the front edges of walls 12, 13, 14 and 15 with a U-shaped groove 32 formed therebetween, as will be described and shown in greater detail.

A cover, indicated generally at 34, for the box is also shown in FIGS. 1, 2, 5 and 6. The cover includes a generally planar body 36 which is shaped and dimensioned to simultaneously close the front opening of the box and also the channel when the body is placed against the open side of the enclosure. Side cover walls 38, 39, 40 and 41 extend perpendicular to body 36 so as to lie outwardly of the wall means 28 when the cover is applied to the box. On the inner surface of body 36 is a continuous four-sided rib 42 which functions to add dimensional stability to the cover and aid in the positioning thereof within the opening at the front of the enclosure. When assembled, rib 42 lies inwardly of walls 12-15, and extends somewhat further away from planar body 36 than do walls 38-41. In the embodiment shown in FIG. 2, latch members 45 and 46 are formed on the inner surfaces of side walls 38 and 40 and are positioned to engage wall means 28 to retain the cover on the enclosure, as will be described.

Projecting perpendicularly from the outer surface of planar body 36 are walls 50, 51, 52 and 53 which form an enclosure surrounding openings 55 extending through body 36. Openings 55 are positioned and shaped so that the usual bosses of a double female receptacle mounted in the box can pass therethrough. A central screw hole 37 optionally can be provided to aid in attaching the cover 34 to the outlet device to hold the cover in the position shown although latch members 45 and 46 are the primary attachment means. Formed on walls 50-53 are further wall means 58 which are substantially identical to wall means 28 and which includes a continuous outer wall 60 which cooperates with and is unitarily formed on walls 50-53. A U-shaped groove 62 is formed between outer wall 60 and the walls 50-53. As in the case of wall means 28, outer wall 60 is shorter than walls 50-53.

At one end of cover 34, which would normally, but not necessarily, be the upper end thereof, are hinge brackets 64 and 65 to receive trunnions on a cooperating lid 66. Each hinge bracket has an arcuate wall portion 68 to receive a trunnion and a support wall 69.

Lid 66, shown separately in FIGS. 7 and 8, includes a planar portion 70 an end part of which is extended to form a tab 72. Walls 74 extend perpendicular to planar portion 70 and are spaced from each other by distances sufficient to lie outwardly of wall means 60. At the end opposite tab 72 are trunnions 76 and 77 formed on support brackets 78 and 79 in positions to engage hinge brackets 64 and 65 to thereby hingedly mount lid 66 on cover 34. As will be apparent from FIG. 2, lid 66 can be swung from the closed position shown therein about 90° to an open position to allow access to the receptacles extending through openings 55 in the cover.

Between trunnions 76 and 77 is a spring cam 80 which bears against one leg of a flat, U-shaped spring 82 the other leg of which bears against the outer surface of body 36. Cam 80 has flat portions against which the spring presses to hold lid 66 in either the open or closed position until manually moved.

Figure 3:
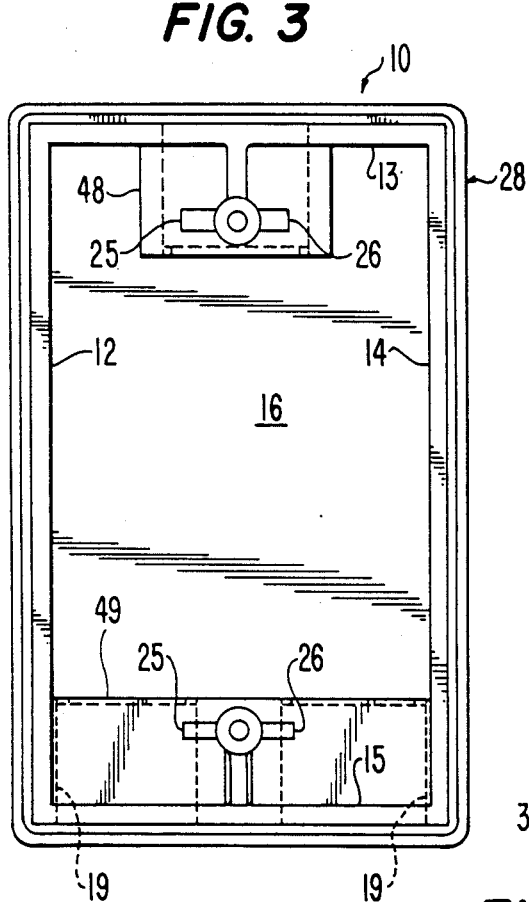
FIG. 3 is a front elevation of the box of FIG. 1 with the cover and lid removed.

As will be seen in FIGS. 1 and 3, passages 18 and 19 are formed as substantially tubular inner surfaces of molded housings 48 and 49 which project into the interior of the box. Housings 48 and 49, screw-receiving projections 20 and support webs 24, 25 and 26 are unitarily molded with end walls 13 and 15 of the box. The housing can be formed so that passageways 18 and 19 are dimensioned to receive the ends of sections of rigid plastic conduit or various kinds of connectors or couplings, but since any of a number of different kinds of articles can be inserted, this structure will be not discussed in detail.

Figure 2:
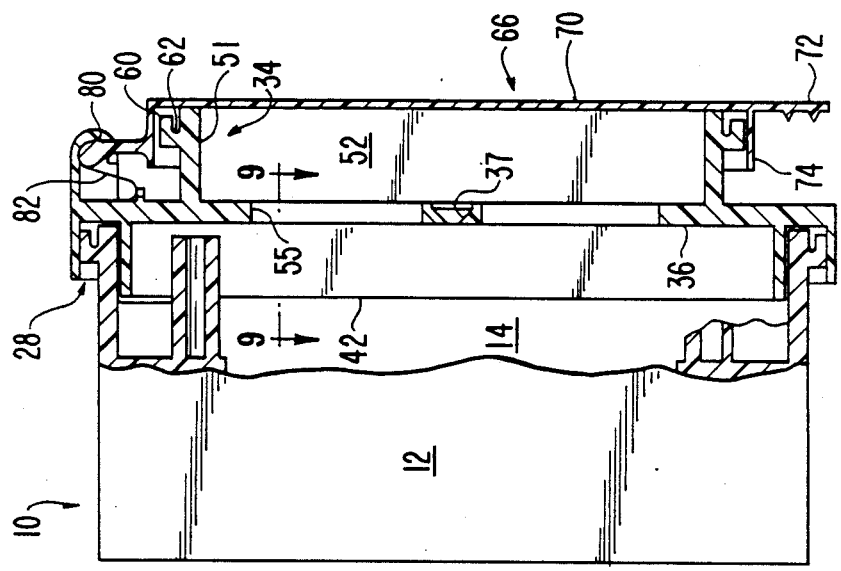
FIG. 2 is a side elevation, partly cut away and in section, of the box of FIG. 1 in an assembled form.
Figure 4:
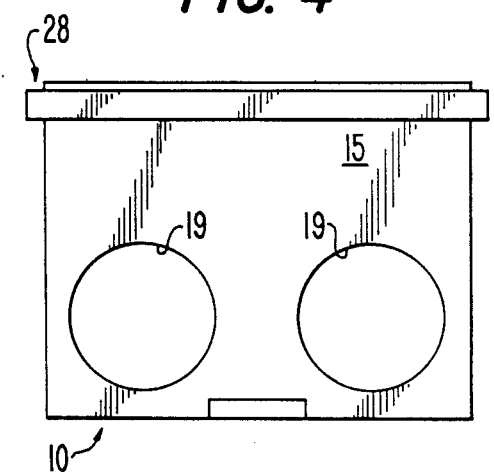
FIG. 4 is an end elevation of the box of FIG. 3.
Figure 6:
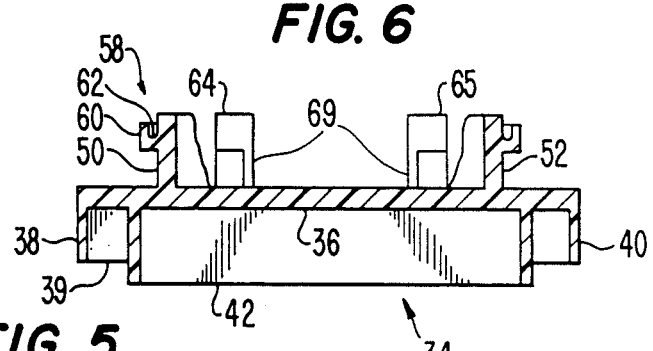
FIG. 6 is a transverse sectional view along line 6—6 of FIG. 5.
Figure 5:
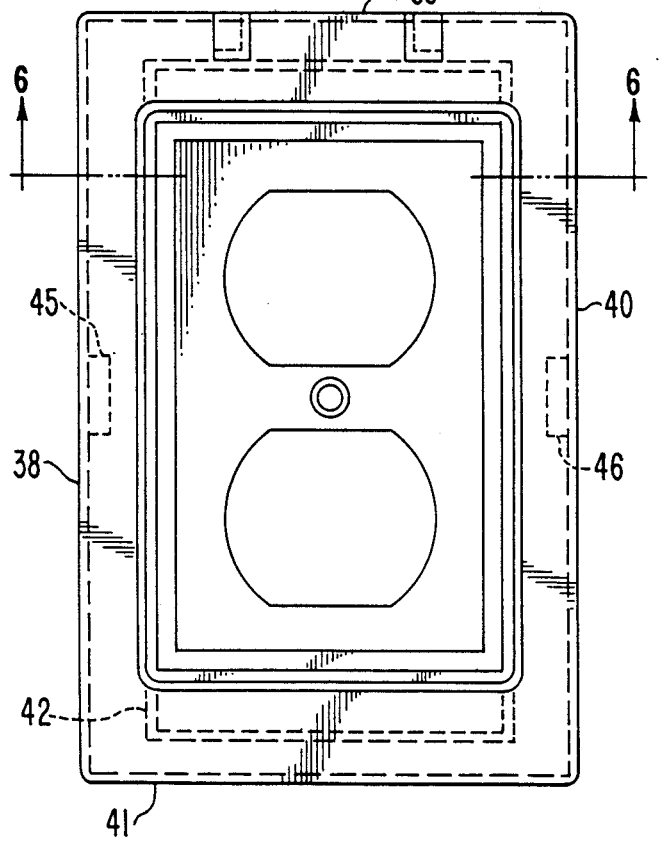
FIG. 5 is a front elevation of the cover of the assembly of FIGS. 1 and 2.

As seen in FIG. 4, the upper or front edges of walls 12, 13, 14 and 15 lie in substantially the same plane and also that the front edges of outer wall 30 lie in a single plane, the plane containing the edges of wall 30 being parallel with and offset toward rear wall 16 from the plane containing the front edges of the inner walls 12-15. As seen in FIGS. 1, 2 and 9 channel 32 is generally U-shaped and the channel faces in the same direction as the interior of the box.

As particularly seen in FIG. 9, latches 45 and 46 are tooth-like projections having an inwardly protruding point, each projection forming an L-shaped surface with the inner surface of one of sidewalls 38 and 39. Also, referring again to FIGS. 1, 2, and 4, the outer surfaces of wall means 30 are formed with sharp, right-angle surfaces 54 to mate with the latch surfaces. Thus, while the cover is intended to remain in the position shown in FIG. 2, it can be removed for installation or service by flexing walls 38 or 40 to release a latch. Preferably, walls 38 and 40 are made rather stiff so that a tool is needed for cover removal as a safety feature to minimize tampering. Currently, latches made in accordance with the embodiment shown withstand a 450 lb. pull.

The assembled box and cover is shown in FIG. 2, partially cut away to show part of the interior in side elevation. Rib 42 fits within the end and side walls to assist in positioning the cover with respect to the box and, as previously indicated, to provide dimensional stability for the cover. While the unit can be mounted in any orientation, either wall 13 or 15 would normally be considered the top wall.

The assembled latch portion of the box and cover are shown, somewhat enlarged, in FIG. 9 wherein the relationship of the outer surfaces of wall 30, particularly corner 50, and latch 46 can be seen. Additionally, the general relationship between rib 42 and the inner surface of wall 14 can be seen. It will be recognized from FIG. 9 that, in order to be able to assemble the cover and box, it is necessary that either the sidewall of the cover, wall 39 in this case, or the upper portion of the box wall, wall 14 in this case, be flexible to some degree. Preferably, the cover wall is flexible, at least, so that the box can be made of a variety of materials without regard to flexibility, e.g., cast aluminum.

It should be mentioned at this stage that the fit of the cover to the box is especially important in that the cover should fit the box loosely, i.e., the fit should allow for adequate spacing for drainage to take place. It is essential to proper operation of the water-excluding system that capillary action be avoided. Such action is promoted by tight-fitting surfaces. Accordingly, the present invention employs loose fits and provides a water catching and drainage system which carries away water rather than simply trying to seal it out.

In operation, the channel 32 and the space between the cover walls and wall means 28 receives any water which enters around the edges of the cover. With the box mounted so that the outer surface of planar body 36 of cover 34 lies in a generally vertical plane, any water 55 which exists in channel 32 or surrounding areas will flow toward the lowest point of channel 32. At each side of the box and cover a gap is formed because wall 30 is shorter than walls 12–15 so that drain points exist at each side, regardless of which is the lowest point, for water delivered by channel 32 to exit the box.

While one advantageous embodiment has been chosen to illustrate the invention, it will be understood by those skilled in the art that various changes and modifications can be made therein without departing from the scope of the invention as defined in the appended claims.

What is claimed is:

1. A water-excluding housing for electrical wires and devices comprising the combination of
    a box having side and rear walls forming an enclosure with an open front, said side walls having front edges terminating in substantially the same plane and defining the front opening of said enclosure;
    means in at least one of said walls forming an access passageway for wires to the interior of said enclosure;
    wall means including a substantially continuous outer wall defining with said side walls a substantially continuous elongated channel extending entirely around said front opening outwardly of said side walls, said channel being generally U-shaped in cross section with the opening of the U facing in the same direction as said enclosure, said outer wall terminating in a front edge lying rearwardly of said plane containing said front edges of said side walls;
    a cover for said box, said cover having
        a generally planar body shaped and dimensioned to contemporaneously close said front opening and said channel, when said planar body is placed against said open side of said enclosure, and
        a plurality of side cover walls extending rearwardly perpendicular to said body so that when said cover is placed on the front of said enclosure said side cover walls are outwardly of and surround said wall means; and
    means for holding said cover on said box,
    said cover being dimensioned to loosely fit over said enclosure and wall means so that a gap is formed for drainage of water, whereby water tending to enter said box is conducted by said channel to and out of said gap.

2. A housing according to claim 1 and further including means defining openings through said planar body; and
    second wall means projecting from an outer surface of said planar body, said second wall means defining a substantially continuous elongated channel extending around said openings, said channel being generally U-shaped in cross section with the U facing in the same direction as said enclosure.

3. A housing according to claim 2 and further including
    a lid comprising a second planar body and rearwardly extending side walls dimensioned to loosely surround said second wall means; and
    means for hingedly connecting said lid to said cover.

* * * * *